(12) United States Patent
Wirch et al.

(10) Patent No.: US 8,316,314 B2
(45) Date of Patent: Nov. 20, 2012

(54) INTELLIGENT MULTI-FUNCTIONAL MACROS LANGUAGE FOR ANALYTICAL MEASUREMENTS

(75) Inventors: Ricky T. Wirch, Verona, WI (US); Gary Neal Giss, Belleville, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 331 days.

(21) Appl. No.: 12/827,411

(22) Filed: Jun. 30, 2010

(65) Prior Publication Data

US 2012/0005604 A1 Jan. 5, 2012

(51) Int. Cl.
*G06F 3/048* (2006.01)
(52) U.S. Cl. ........ 715/771; 715/704; 715/744; 715/762; 715/763
(58) Field of Classification Search .................. 715/704, 715/744, 762, 763, 771
See application file for complete search history.

(56) References Cited

U.S. PATENT DOCUMENTS

| | | | |
|---|---|---|---|
| 5,497,500 A | 3/1996 | Rogers et al. | |
| 5,517,663 A | 5/1996 | Kahn | |
| 7,031,960 B1 | 4/2006 | Costin et al. | |
| 2006/0005132 A1* | 1/2006 | Herdeg | 715/704 |
| 2009/0089739 A1 | 4/2009 | Mollicone et al. | |

OTHER PUBLICATIONS

Resnick et al., "Scratch: Programming for All," Communications of the ACM, (2009) vol. 52, No. 11, pp. 60-67.

* cited by examiner

*Primary Examiner* — Ba Huynh
(74) *Attorney, Agent, or Firm* — Michael C. Staggs

(57) ABSTRACT

A novel software application method, as integrated with various scientific instruments, is introduced herein that allows new capabilities to be added to the language at runtime without, if desired, having to re-compile the application. As part of the software capabilities, the macro programming language presented herein enables automated connection between inputs and outputs of action statements within a script with visual feedback for configuration verification. As another aspect, the macro programming language of the present invention provides for automation of different spectroscopic applications, which if desired, also allows for the automatic generation of a configurable user interface connected to the intent of the macro.

10 Claims, 14 Drawing Sheets

INTELLIGENT MULTI-FUNCTIONAL MACROS LANGUAGE FOR ANALYTICAL MEASUREMENTS

BACKGROUND OF THE INVENTION

1. Field of the Invention

The present invention relates to the field of analytical instrumentation software. More particularly, the present invention relates to customizable user environment (CUE) software that enables an end user to easily run complex scientific instrumentation.

2. Discussion of the Related Art

Spectral analysis via a number of analytical techniques ranging from optical to mass spectroscopic methods provide efficient, accurate, qualitative and quantitative analysis of a vast array of samples to an end user. For example, given a sample of an unknown composition, UV-Vis spectral analysis using a custom but often commercial scientific instrument can be used to determine the amount of a particular substance present in the sample. A test process can be performed on the sample, and a UV-Vis spectrum is produced. The analysis itself is desirably aided by software controlled techniques that include manipulating induced wavelength illumination, background subtraction, and inter-spectra operations (e.g., Ratio and Absorbance Difference measurements for quick comparisons), so as to generate output values indicative of the various substances in the sample material in an expedient manner.

It is thus understood that a particular instrument and its analysis capabilities requires different sets of unique instructions for manipulating desired interrogation and analysis parameters in operation of such instruments. As part of almost any commercial scientific instrument, embedded software is provided to assist an end-user in the ease-of-use of the instrument(s) for stand-alone esoteric as well as routine operations. Depending on the desired measurement(s) and the level of understanding of the end-user, the provided software can range from context sensitive keystrokes for routine operations to providing the means for customized created methods, i.e., customized macro programs that can also provide routine but more often advanced analysis.

Macro programs in particular can easily be created by a user who has no knowledge of programming. However, an end-user in desiring to create a program associated with a purchased scientific instrument must often learn the programming syntax for such instruments and thus can become intimidated by even the most simplistic of tasks. To encourage the development and use of the associated macro programming products, a company can provide Graphic User Interface (GUI) software that includes ease-of-use manipulation so as to easily develop a program for a specific application.

As a beneficial example, an interface to a GUI macro programming application can be provided with options from a drop-down menu so as to build a script of elements of his or her desired macro. The end-user selects from specific drop-down menus to enable specific actions manipulated to a workspace, wherein the end-user must connect them up, compile the operation, and execute the program for the desired programmed action. Such a procedural method enables the end-user to introduce action items into a worksheet space without requiring such an end-user to write a program to prescribe how the actions actually operate. Because such a method is easy, confidence increases for even the most unsophisticated of programmers leading to the development of complex macro programming that often but not necessarily require some programming skill. Moreover, the ease of operation of the provided controls to build a macro program induces a person to take further steps to learn the programming skills needed to achieve greater flexibility and create more complex applications.

Background information on a system and method that utilizes an interactive Graphic User Interface (GUI) to automatically create a database, is described and claimed in, U.S. Pat. No. 7,032,960 B1, entitled, "DATABASE PROGRAM WITH AUTOMATIC CREATION OF USER FEATURES," issued Apr. 18, 2006, to Costin et al., including the following, "[t]he present system defines a technique allowing automatic creation of appropriate information based on entered data. A result of this automatic creation as described herein is the formation of custom databases of information without programming or specialized learning. The databases are created automatically from initial specifications of the information."

Background information on a system and method that incorporates animated icons to visualize programming flow and operation, is described and claimed in, U.S. Pat. No. 5,517,663, entitled, "ANIMATED USER INTERFACE FOR COMPUTER PROGRAM CREATION, control and execution" issued May 14, 1996, to Kahn, including the following, "[a] computer programming system provides animated program sources that are created in an interactive visual manner. Animation is integrated with computer programming to allow a user or programmer to visualize programming flow and operation. Animated depictions are thus produced for dynamic phenomenon, such as concurrent computations. The program system supports a computation model of concurrent communicating agents. A concrete metaphor for the computation model is provided, e.g. agents are implemented as buildings; rules or methods are implemented robots or workers inside of buildings; local state is posted on bulletin boards inside of buildings; couriers carry messages between buildings; and so on."

Background information for a system that uses interactive media to enable children to learn programming skills is described by Resnick et al., "Scratch: Programming for all," Communications of the ACM, Vol. 52, no. 11 (November 2009), pp. 60-67, including the following, "Scratch is designed to be highly interactive. Just click on a stack of blocks and it starts to execute its code immediately. You can even make changes to a stack as it is running, so it is easy to experiment with new ideas incrementally and iteratively."

However, conventional macro programming languages described above and as present in the industry do not allow for direct link-up of the specific elements in the script (i.e., automatic parameter routing), often call up an end-user to compile the developed software to enable the execution of the program, and do not provide the ability to create customizable new code (macros) in an interactive visual manner ranging from the complex down to even the most simplistic of software programs.

Accordingly, a need exists in the industry for a macro programming language in association with predetermined scientific instruments to meet their needs in as simplistic a manner as possible.

SUMMARY OF THE INVENTION

Generally, the present invention provides a novel approach to macro programming so as to enable automated connection, i.e., dynamic parameter routing, between inputs and outputs of action statements within a script with visual feedback for configuration verification. As another aspect, the macro programming language of the present invention provides for automation of different spectroscopic applications, which if desired, also allows for the automatic generation of a configurable user interface (UI) connected to the intent of the macro.

The present invention is thus directed to a customizable macro programming language to enable one or more analytical measurements of a sample, that includes: dragging one or more desired action statements onto a user interface workspace to provide a script; automatically connecting and interlinking the inputs and outputs of the one or more action statements, wherein if the one or more additional required inputs and outputs are not present or cannot be unambiguously provided in the script, the representation of the dragged one or more desired action statements are put into a visual second state, if the one or more additional inputs and outputs can be determined to be connected and interlinked in the script, the representation of the dragged one or more desired action statements are put into a visual first state; then executing without compiling the desired script to provide spectral data according to said action statements; wherein the spectral data include measurements resultant from at least one analytical instrument selected from an optical microscope, a chromatographic instrument, an optical spectrometer, and a mass spectrometer; and automatically generating a configurable user interface (UI) element as based upon the one or more action statements of the script.

DETAILED DESCRIPTION

Figure 1A:
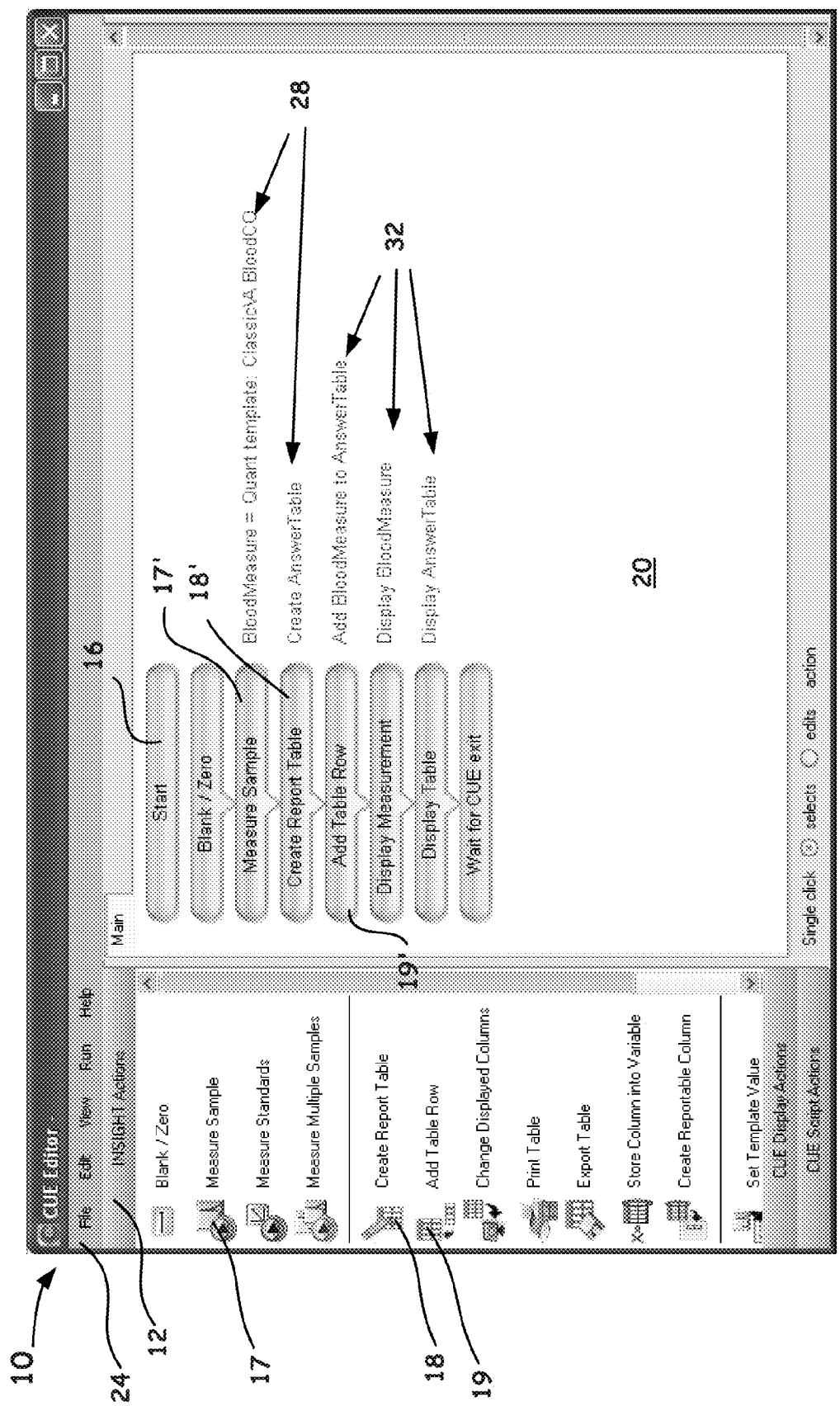
FIGS. 1A, 1B, 2A, and 2B show a series of images to illustrate the Customizable User environment (CUE) dynamic parameter routing capabilities of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention provides a macro programming language having a customizable user environment (CUE) that enables an end user to rapidly create customized stand-alone program modules for one or more different analytical instruments. A unique aspect, as presented herein, is the dynamic parameter routing capabilities of the macro language that enables automatic connection of inputs and outputs of various statements (action items) that interlink with resultant visual feedback as to the operability of a given program. Additionally, the design of the macro programming language presented herein enables automation capabilities for different scientific analytical applications with the benefit of also automatically generating, if desired a configurable user interface (UI) to the intent of the macro. In particular, the CUE, as disclosed herein, is a multi-capability macro programming language that allows, if desired, new automation capabilities for different analytical instrumentation to be added by a highly skilled artisan without recompiling or modifying the CUE software. This is accomplished by copying a DLL with new functionality into the directory where CUE resides.

An end-user thus builds his or her desired macros by using software commands and information aided by the use of a computational system (e.g., a personal computer) as often coupled to one or more input devices, such as a keyboard and/or a pointing device, e.g., a mouse, that are connected to the system by way of a serial port interface. Other types of pointing devices include track pads, track balls, pens, head trackers, data gloves, and other devices suitable for positioning a cursor on a display device, such as, a computer monitor, which enables ease of development of the desired macros.

It is also to be appreciated that instructions to start predetermined measurements, the merging of data via for example, inter-spectral manipulations (division, subtraction, multiplication between one or more collected various spectra), the exporting/displaying of results, e.g., such as composite informational spectra, e.g., merged or multiple spectra resulting from one or more spectroscopic techniques, may be, as coupled to a computational system, be executed under instructions stored on a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software. In particular, the computer-readable media can often include local or remote memory storage devices, such as, but not limited to, a local hard disk drive, a floppy disk, a CD-ROM or DVD, RAM, ROM, a USB memory device, and even any remote memory storage device known and understood by those skilled in the art.

Those skilled in the art can also appreciate that the associated software of the present invention may be implemented in other computer system configurations, that can include handheld devices, microprocessor based or programmable consumer electronics, network personal computers, minicomputers, mainframe computers, etc. The invention may also be practiced in distributed computing environments, wherein associated tasks are performed by remote processing devices that are linked through a communications network (e.g., wireless). In a distributed computing environment, created macro modules may be located in both local and remote memory storage devices.

To reiterate, it is to be appreciated that almost any end-user can easily create unique macro applications, which automatically link up and provide visual verification as to operability, by adding new content to a default user interface framework or by building a unique macro module to implement new methodologies and features for completely different sample and instrumentation interrogation applications. As another beneficial aspect of the present invention, the language described herein is capable of automation capabilities for different applications disparate as automating batch files (a type of script that contains a list of commands) to running complex scientific equipment.

Such scientific instruments that can be supported by the one or more customized macros of the present invention include a number of optical and mass spectrometer instruments, imaging instruments, chromatography instruments (e.g., gas and liquid), all of which are commercially or otherwise available to those of ordinary skill in the art.

Example imaging instruments include any one of, scanning instruments, confocal instruments, digital imaging instruments, and telescopic instruments, etc. Example chromatography instruments can include electrophoresis instruments, gas chromatography instruments, and liquid chromatography instruments, etc.

Example optical spectrometer instruments can include a UV-Vis, spectrometer, a Fourier Transform (FT) spectrometer (e.g., Fourier Transform Infrared (FTIR) spectrometer), a Fluorescence Spectrometer, a Raman Spectrometer, an Infrared Spectrometer (IR), and an X-Ray spectrometer. Example mass spectrometers that can be adapted with the software of the present invention can include a variety of single stage analyzer systems (conventionally called tandem in time) capable of mass spectrometry, such as, for example, a time-of-flight (TOF) device, a linear ion trap (LIT), magnetic and electrostatic analyzers, a quadrupole, an ion cyclotron resonance (ICR) instrument, an orbitrap, or a Fourier Transform Mass Spectrometer (FTMS) as well as multiple stage analyzers (tandem in space), as known to those of ordinary skill in the art. The important point to note is that each of the above generally described instruments naturally has a different set of unique measurement and analysis capabilities and thus often require different sets of unique instructions for displaying and operating such instruments, which is one of the beneficial aspects of the customizable interactive software of the present invention presented herein.

To appreciate the differences in instrumentation capabilities provided by a spectrometer, such as an optical dispersive spectrometer, a range of input light wavelengths are supplied to a specimen, and the output light from the specimen is received by a monochromator—a device which breaks the output light into its component wavelengths—with one or more detectors then measuring light intensity at these output wavelengths to generate the output spectrum. When configured as an Ultraviolet-Visible Spectroscopy (UV-Vis) instrument, the range of input light wavelengths (or frequencies) are in the ultraviolet and visible regions of the electromagnetic spectrum that are absorbed by a sample under interrogation, which characterizes the electronic energy levels of its molecular constituents. Specific UV-Vis absorption bands enable a user to characterize certain molecular components, such as aromatic groups or carboxyl (CO) groups.

In an FT spectrometer, an interferometer is used to supply an interferogram—a time-varying mixture of several input light wavelengths—to a specimen, and one or more detectors measure the (time-varying) output light from the specimen. The various wavelengths of the output light can then be "unscrambled" using mathematical techniques, such as the Fourier Transform, to obtain the intensity of the output light at its component wavelengths and thereby generate the output spectrum.

In a Fluorescence/Phosphorescence spectrometer, a detector is configured to collect the light from a molecule transitioning from a higher to a lower energy state during a given time period after the molecule absorbs one or more photons of light. As a result, the fluorescence emission and correlated intensity are determinative of the redistribution of energy in the molecule after light absorption. Light emission in time scales of less than a millisecond is typically characterized as fluorescence wherein time scales greater than a millisecond is generally referred to as phosphorescence.

In a Raman spectrometer, vibrational, rotational, and other low-frequency modes in a system can be investigated upon illumination from an intense optical source, such as a laser having emission wavelengths in the visible, near infrared or near ultraviolet range.

In an Infrared (IR) spectrometer, ranges of wavelengths and associated frequencies in the infrared region or near-infrared region of the electromagnetic spectrum are absorbed by an interrogated sample so as to investigate its molecular constitution. Infrared absorption bands identify molecular structure components, such as aromatic, olefin, aliphatic, aldehyde, ketone, carboxylic acid, alcohol, amine, and amide groups. The frequency at which absorption occurs also reflects the frequency at which the bonds in these components stretch and and/or bend.

X-ray spectrometers capitalize on electron transitions releasing energy in the form of X-ray (X-ray photon) emissions from a sample, wherein the X-rays have energies and wavelengths which are characteristic of the atoms of the sample from which they were emitted, i.e., they are characteristic of the elemental composition of the sample. Thus, such instruments can measure and analyze the X-ray energies and/or wavelengths to identify and quantify the elemental composition.

In a Mass spectrometer, one skilled in the art often utilizes any of the aforementioned instrumentation and techniques for separating and identifying molecules based on mass, in particular, identification based on mass-to-charge ratios (m/z).

Specific Description

As briefly described above, it is to be understood that the present invention provides a macro-programming language comprising three novel beneficial aspects: A) one that can provide dynamic parameter routing, i.e., one that can understand that various statements require inputs and outputs that require automatic coupling when possible with visual verification to an end-user; B) a multi-capability macro programming language that can provide automation capabilities for different scientific spectroscopic applications; and C) a macro programming language that automatically generates a configurable user interface (UI) to the intent of the macro. Each will be discussed sequentially in the following sections in a non-limiting manner as to order of discussion.

Dynamic Parameter Routing

The beneficial dynamic parameter routing aspect of the present invention is directed to macro programming with a customizable user environment (CUE) that can in a novel fashion automatically connect together inputs and outputs of various statements (action items) and interlink them when required while verifying to an end-user whether such statements are configured properly or require attention. As part of the ease-of-operation, when the information mandated to automatically complete a macro programming statement can be performed in an unambiguous manner, the action statement is automatically completed with the correct choices and displayed in a hue (e.g., a first colored state such as blue) indicative with respect to the hue of other displayed statements. This beneficial aspect of the invention visually apprises the end-user that such one or more action statements are properly configured. When the information required to automatically complete a macro programming statement cannot be automatically performed in an unambiguous manner, the statement is now displayed in an indicative hue (e.g., a second colored state such as red) to alert the end-user that he or she needs to provide input or output information that cannot be automatically inferred from the provided programming language. Moreover, it is also to be appreciated that as statements are added or removed or edited, the macro automatically recalculates if the information is present to auto-complete the statements and turn them into one of the configured states that alerts the end-user as to operability (e.g., red to blue or vice-versa).

Accordingly, such a novel dynamic parameter routing aspect, as described herein, makes it virtually simplistic for an end-user to write even complex routines because they do not need to provide as much information to create a working macro program, the beneficial result of which is a faster and more intuitive editing process. Moreover, the dynamic parameter routing aspect also makes it possible to link all the statements together that are inter-related so that if a customer changes the name of a piece of information related to a script, it ripples throughout the configured macro and the changed name occurs in all related statements as well.

Figure 1B:
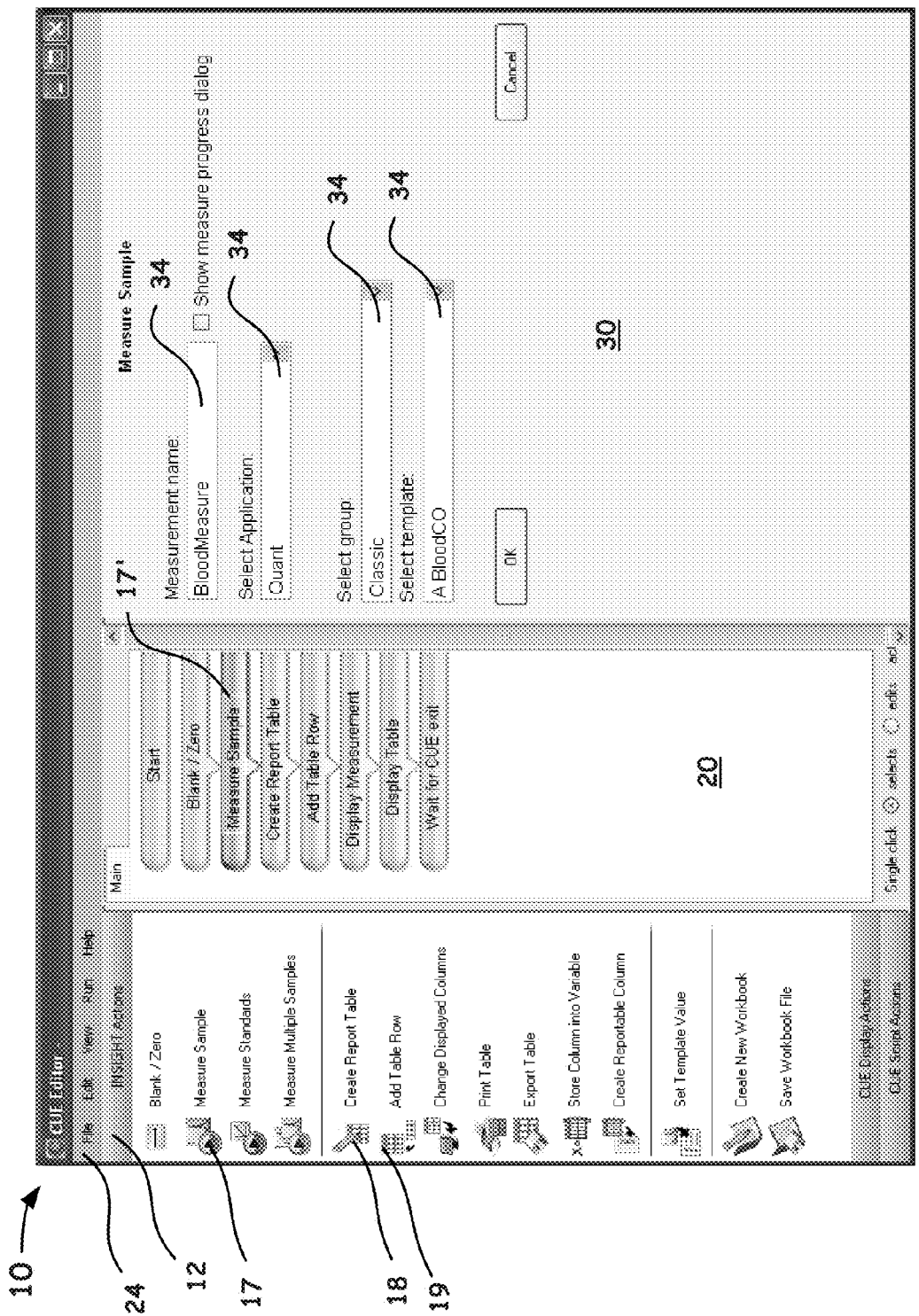

To further the understanding of the present invention, FIGS. 1A and 1B are provided to illustrate the ease of building a macro as described herein and to generally provide insight to the reader as to the dynamic parameter routing capabilities of the present invention. Specifically, FIG. 1A shows a Customizable User Interface (CUE) editor window for creating, editing, and testing scripts, as generally designated by the reference numeral 10. The CUE editor window 10, which first appears when the application starts, includes an action pane 12 having actions, e.g., 17, 18, and 19, that can be added to scripts (a list of commands that can be executed without user interaction). The actions, e.g., 17, 18, and 19, are most often grouped by function but can be grouped by associated software related to a particular scientific instrument or application. The right pane is deemed the workspace 20 having predetermined action boxes, e.g., Start 16 and an END action (not shown) initially provided to the end-user for building a desired script. The menu bar 24 provides features for working with scripts, customizing the runtime display, testing scripts, and getting help.

Each action (e.g., 17, 18, 19) is merely directed to the workspace 20 at desired insertion points via end-user manipulation, e.g., clicking and adding or dragging via cursor control. Such a manipulation provides an associated action box 17', 18', 19' to be displayed in the workspace 20, i.e., an associated symbol representing a desired action, 17, 18, 19 for a given a script,. As part of the novel aspects of the present invention, a given hue (e.g., color) for an action box, e.g., 17' is designed to provide additional information (i.e., visual verification to an end-user) of the state of a given action. For example, but not readily apparent from FIG. 1A, a red color indicates that action parameters must be set but changes to blue when the parameters are set. Thus, a blue color indicates that action parameters have valid settings. A gray color indicates that the action has no parameters and a green color often indicates that the action affects the order in which actions are run, such as a loop or if-then action.

Accordingly, given actions, e.g., 17, 18, and 19, are selected and dropped into the workspace 20 to provide a script of action boxes 17', 18', 19', (e.g., Measure Sample, Create report Table, and Add Table Row). In the example shown in FIG. 1A, the software of the present invention thereafter automatically connected, without user input, the Measurement provided by the Measure sample action box 17' and the table created by Create Report Table action box 18' to the Add Table Row action box 19'. As an added beneficial aspect, correlated known parameter statements 28, and 32 are also automatically displayed next to an associated action box to aid an end-user as to the direction the overall script is taking. Note that the first two action boxes (e.g., 17' and 18') create outputs as shown via the associated parameter statements 28, while the displayed parameter statements 32 use the specified "Blood Measure" and "AnswerTable" resultant from their associated action boxes.

FIG. 1B illustrates the ease of editing action boxes to provide the associated parameter statements. In particular, when the "Measure Sample" action box 17' is acted upon (e.g., by double clicking using cursor control), a panel 30, is displayed allowing an end-user to input desired parameter statements 34 into a given selection. In this sample panel 30, the Measurement name specifies the name of this output. As part of the novelty of the present invention, as discussed above, the hue of a particular action box, e.g., 17' having required parameters for actions desirably change, e.g., from red to blue after the parameters have been set to visually alert the end-user that that the action parameters have valid settings.

Figure 2A:
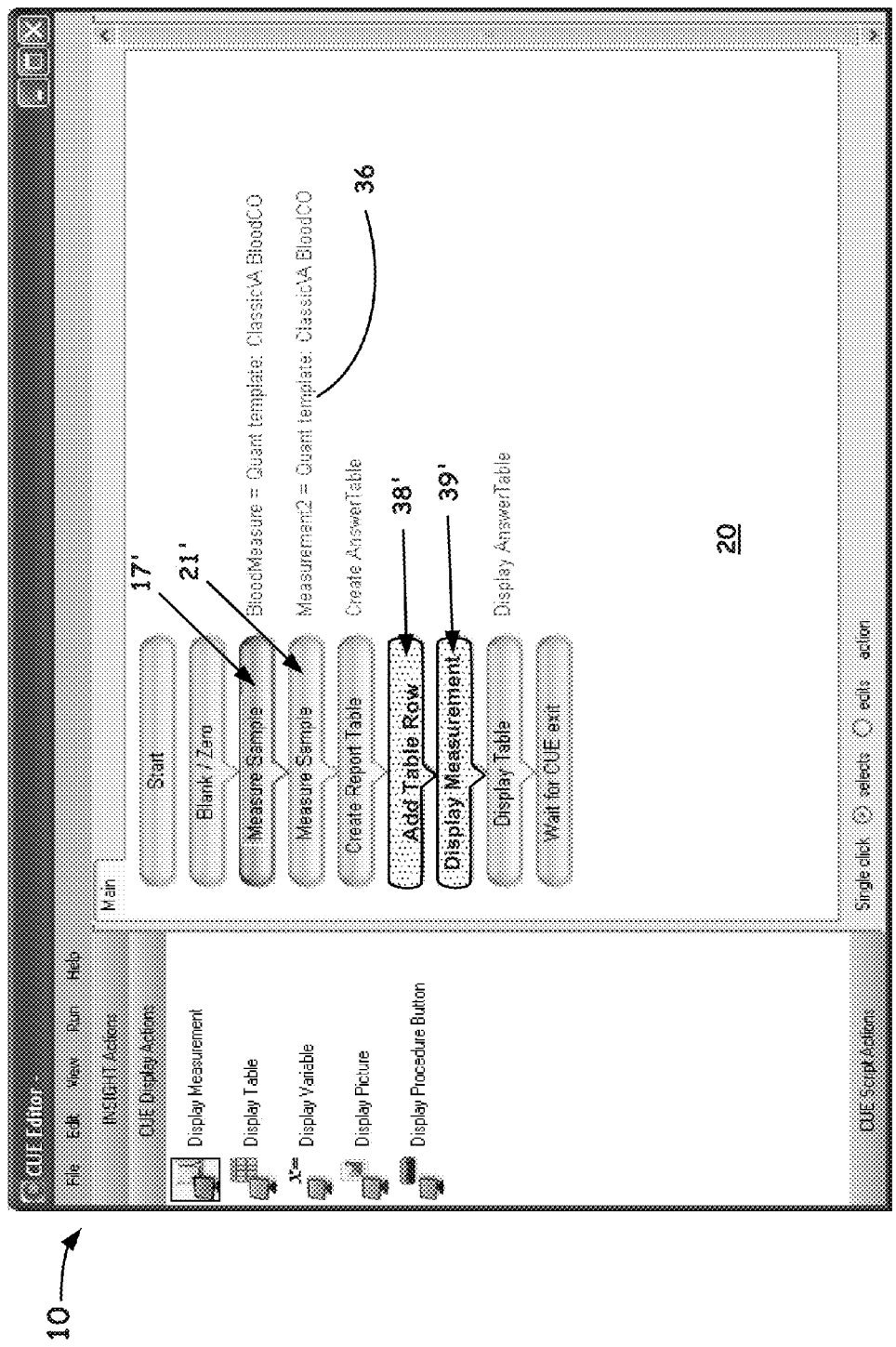
Figure 2B:
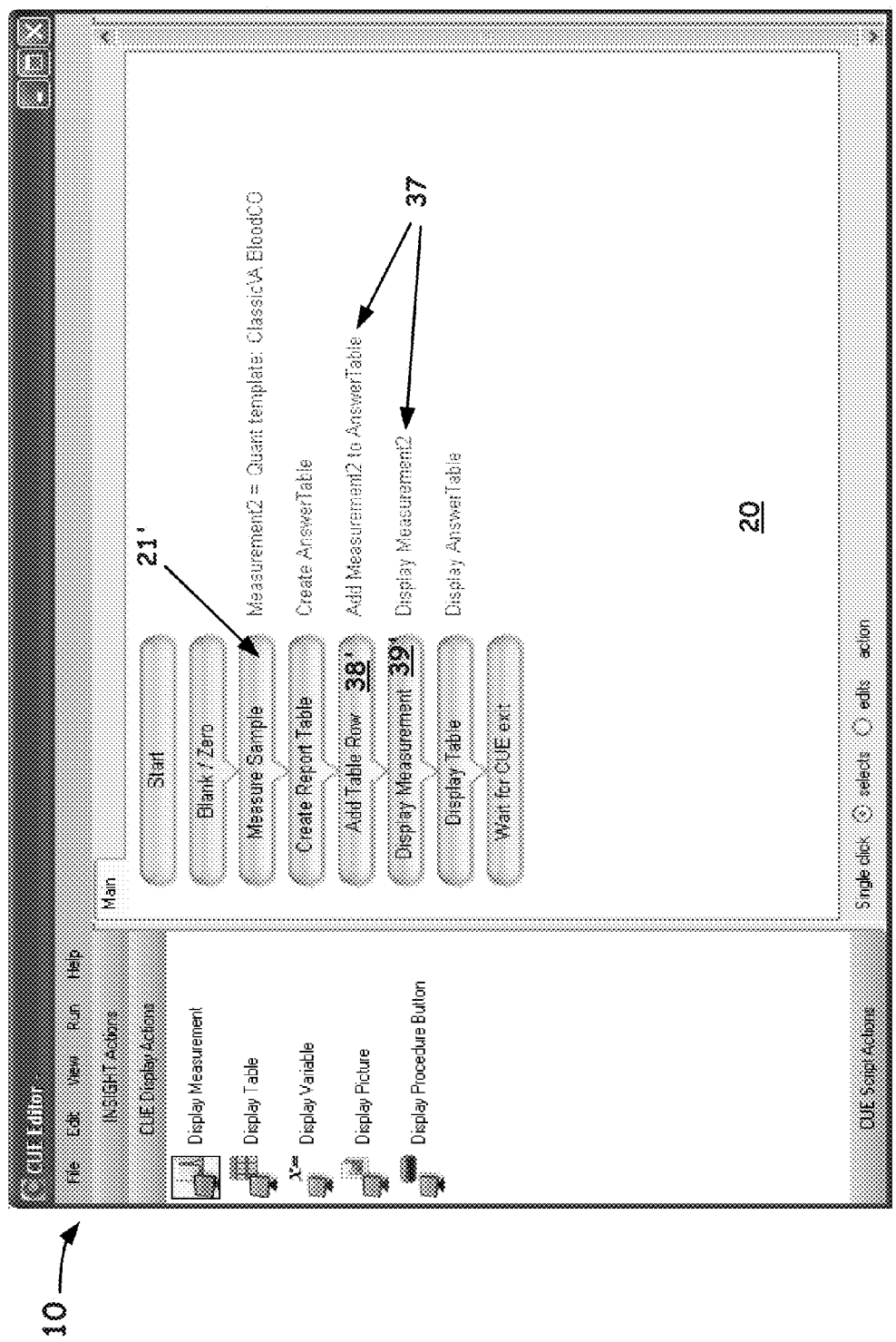

FIG. 2A shows another Measurement action box 21' being added in the building of the script of FIG. 1A with a correlated parameter statement designated as Measurement 2. Again, each of the action boxes are dropped into the workspace 20 but in this case, the embedded software interface interprets that because two measurements are possible (as based on Measurement action boxes 17' and 21' in the script), there is a possibility of 2 measurements being added to the "Add Table Row" action 38 with 2 displayed measurements as provided by the "Display Measurement" action 39. Because the software finds these actions ambiguous, the Table Row action box 38 and the Display Measurement action box 39 are displayed in a state (e.g., a red color) so as to visually alert the end-user that the macro needs attention. In FIG. 2A the "Add Table Row" 38 and "Display Measurement" 39 are shown highlighted with a dashed-like background to simply illustrate the application of such actions being deemed ambiguous by the software described herein. FIG. 2B then shows the first Blood Measure Action 17' being deleted with the software automatically connecting the "Add Table Row" 38 and "Display Measurement" 39 to the "Measurement 2" action item 21'. Thus, the "Add Table Row" 38 and "Display Measurement" 39 action boxes return to an unambiguous state (e.g., blue) to indicate to the end-user that the macro developed is operable.

With respect to the automatic (dynamic) action parameter routing capabilities of the present invention, it is to be noted that all the macro actions provided by the software implement an embedded interface that separates the user interface (UI) for editing the actions from the code that performs the action. In other words, the software automatically connects statements and it does all the work behind the scenes. Such an embedded interface contains many methods, such as, but not limited to:

AreControlContentsValid(action): This asks the UI if all the information necessary to complete the action is valid.

UpdateUIFromAction(action): This takes the specified parameters from the action and puts them into the UI. Additionally, it must look through available outputs and see if there is an unambiguous solution to the requirements for this action if the action is not valid.

UpdateActionFromUI(action): This takes the specified parameters from the UI and places them into the action.

SupportedActions( ): This returns a list of actions that can be edited by this UI.

Additionally, if an action generates an output it must implement a method called DeclareResults( ) which specifies the name and type (category) of each result (output) created by this action. The macro language editor must be cognizant of this behavior and declare all the results before macro execution is to begin and also before and after any macro action is edited. Then if the DeclareResults( ) method specifies that some new results were generated, the macro language must go through all the actions and attempt to autocomplete them, because it might be possible to change the state from red to blue or vice-versa.

Figure 3:
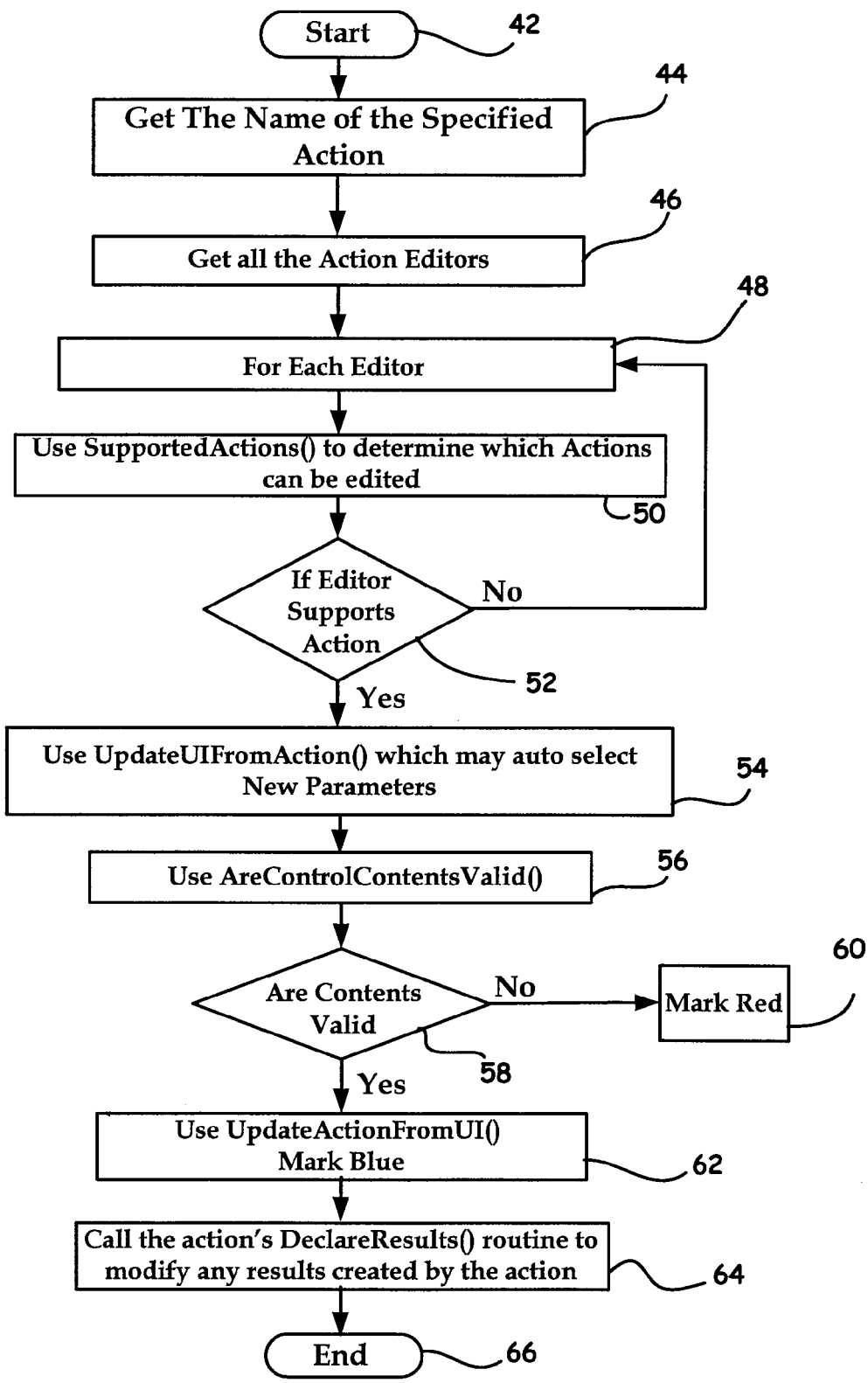
FIG. 3 shows a flowchart of Automatic action parameter routing.
Figure 4:
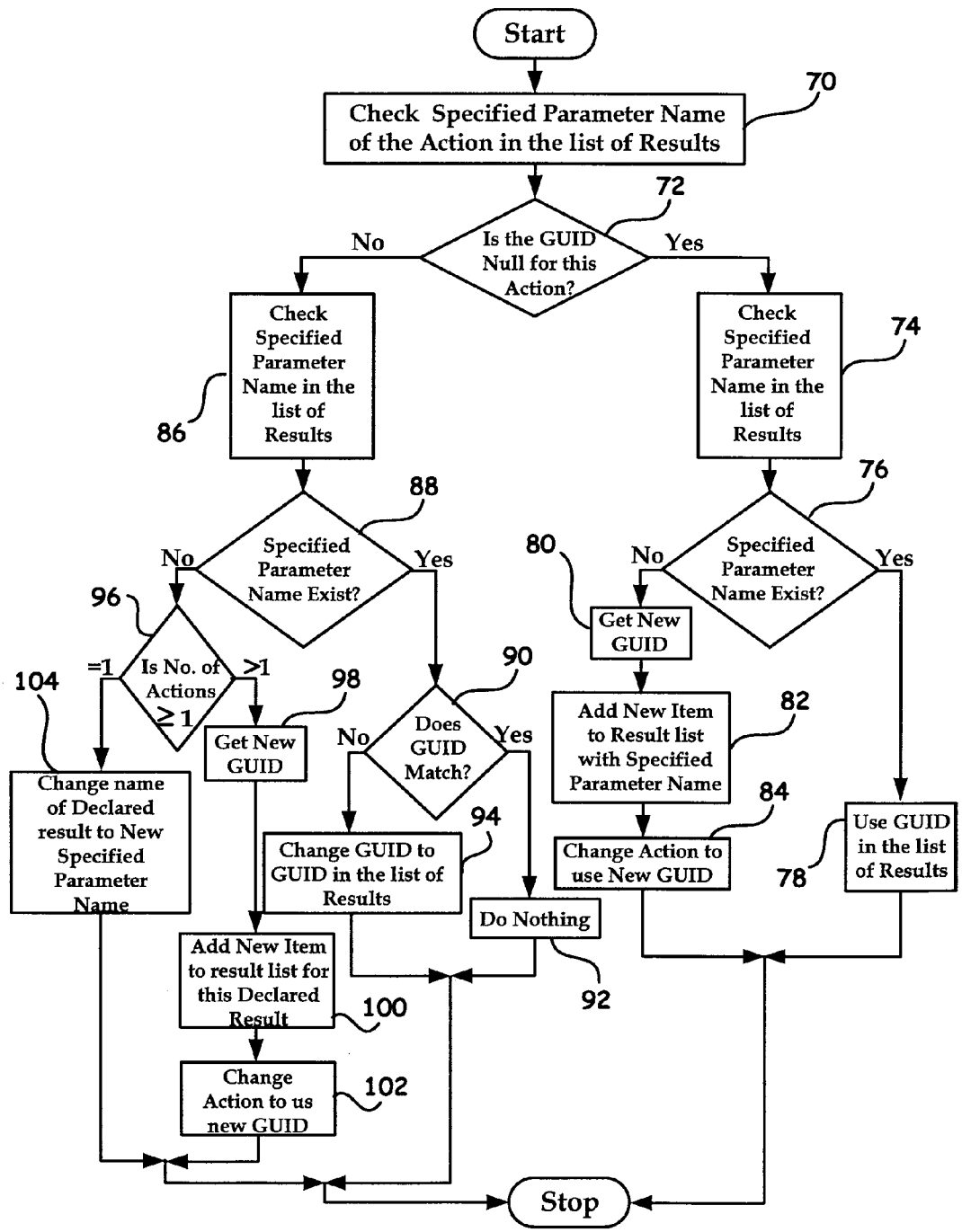
FIG. 4 shows a flowchart procedure of the DeclareResults ( ) on an action.

FIGS. 3 and 4 are exemplary flowcharts generally describing the novel dynamic parameter routing process of the present invention. FIG. 3 in particular, shows a flowchart of the present invention which is executed for every action of a developed macro so as to autocomplete the action when one or more outputs change because of DeclareResults( ). Thus, an end-user, such as, an engineer or technician engaged in the development, modification, or testing of software code for a specific application can open the Customizable User Interface (CUE) editor window described herein and build a series of actions to form a desired script of macro. In development of a given script, the embedded interface software automatically starts the autocomplete process, as shown by the reference character 42. In block 44 of the flowchart, the software retrieves the name of the specified action and then gets all the action editors, as shown by block 46. Thus for each editor, as shown by block 48, the novel interface software of the present invention calls on a process (i.e., Use SupportedActions( ), shown as block 50, to determine which actions can be edited by the desired UI. If the editor, as shown by decision branch 52, supports the action, it calls upon the process (i.e., UpdateUIFromAction( )), as shown by block 54 that takes the specified parameters from the UI and places them into the action. Additionally, it must look through available outputs and see if there is an unambiguous solution to the requirements for this action if the action is not valid. The software, as shown by block 56, then calls on the process AreControlContentsValid(action) to determine if all the information necessary to complete the action is valid. If yes, as shown by the decision branch 58, the action boxes are marked blue, as shown by box 62, if not the action boxes are marked red, as shown by box 60. Specifically, the process UpdateActionFromUI( ) takes the specified parameters from the UI and places them into the action. Before this process ends 66, the routine of DeclareResults( ), as shown by block 64, is called on to modify any results created by a respective action. This particular routine is a part of every macro action and declares an output (result) using the specified parameter name and type and also returns a globally unique ID (GUID) for that output (result). Moreover, this routine maintains a count of each parameter name (result) declared by an action.

FIG. 4 thus shows a flowchart of DeclareResults( ), as shown by block 64, in FIG. 3. To reiterate, every time an action is added or deleted from a macro, DeclareResults( ) is called on that action. Whenever DeclareResults( ) for an action returns true, this means that a new output (result) has been declared. When this occurs, the embedded software goes through every action and performs the autocomplete procedure. As part of the process, the software checks the Specified Parameter Name of the action in the list of results, as shown by block 70 in FIG. 4. Thereafter, the software checks to see if the globally unique ID (GUID) is null for a particular action(s), as shown by decision branch 72. If the GUID for this action is null (Yes) and the software locates the specified parameter name in the list of results for that type, as shown by respective block 74 and decision branch 76 (Yes), then the software knows to use the GUID found in the list of results, as indicated by block 78. If however, the GUID for this action is null and the software does NOT find the specified parameter name in the list of results for that type, as shown by decision branch 76, then the software gets a new GUID, as shown in block 80, adds a new item to the result list with the specified name, as shown in block 82, and then finally changes this action to use this new GUID for this declared result, as shown in block 84. If, on the other hand, the GUID is not null, as shown by the decision branch 72 of FIG. 4 (i.e., No), and the software locates the specified parameter name in the list of results for that type, as shown by respective block 86 and decision branch 88 (Yes), and if the specified name in the list of results and that item in the list has the same GUID, as indicated by decision branch 90 (Yes), then the software does nothing, as indicated by block 92. If the specified name is found in the list of results, but the GUID for this action does not match, as indicated by decision branche 88 (Yes) and decision branch 90 (No), then the software automatically changes the GUID of this action(s) to the GUID of an item found in the list of results, as shown by block 94.

If the GUID is not null, and the specified parameter name is NOT in the result list, and the name in the result list for this action(s) GUID is different, as respectively indicated by decision branch 72, and blocs 86, and decision branch 88, then if the number of actions that declare this parameter result is =1, as shown by decision branch 96, the software changes the name of the declared result in the result list to the new specified parameter name, as shown by block 104.

If the number of actions that declare this parameter result is >1, as also determined by decision branch 96, then the software knows to get a new GUID, add a new item to the result list with the specified name, and change this action to use this new GUID for this declared result, as respectively shown by blocks 98, 100, and 102.

As stated above, all the processing shown above for automatic dynamic parameter routing (i.e., automatically completing statements) does all the work behind the scenes but does not display the UI, as shown by panel 30 of FIG. 1B, to the user and only changes the states of the action boxes from red to blue and vice versa to alert the end-user as to the operability of a given developed macro.

Multi-Capability Programming (Macro) Language

A multi-capability macro programming language that can provide automation for different scientific spectroscopic applications is another beneficial aspect of the present invention. In particular, this aspect of the present invention allows new capabilities (or macro statements) to be added to the language at runtime without recompiling (note that compiling is still an option) the application and as a result, enables the macro programming language to accept statements for completely different applications.

As a beneficial non-limiting example, the language can be configured to support macros for any of the above described scientific applications, such as, but not limited to, UV-Vis, FTIR, IR (Near Infra-red (NIR), Raman, mass spectroscopy, etc., each of which has its own respective set of unique capabilities. Thus, as part of the novel benefits presented herein, the macro language of the present invention can not only support such diverse applications singly, but also simultaneously, and know whether it should display the UI and statements for a particular application based upon the contents of a loaded macro that has been previously developed.

Figure 5A:
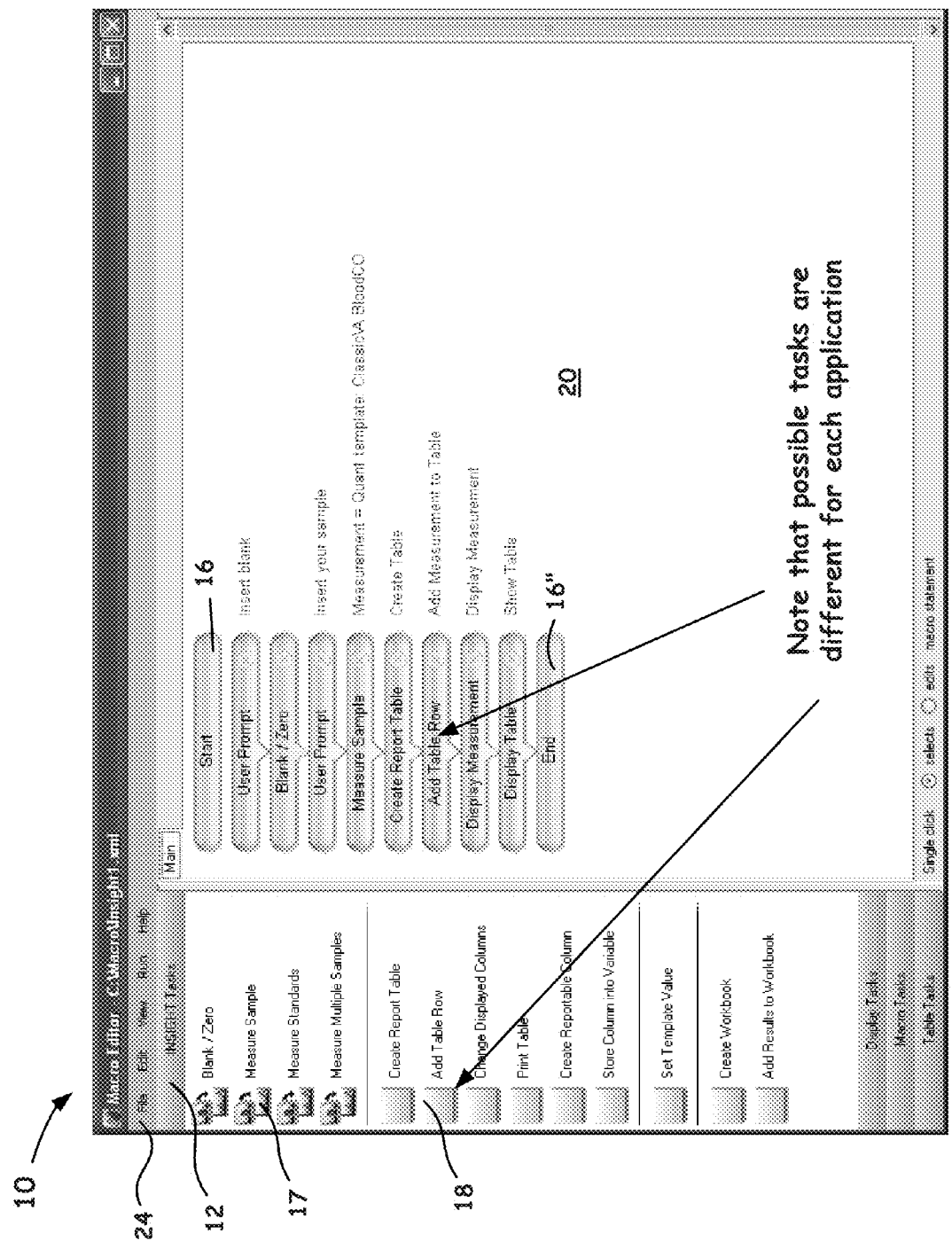
FIGS. 5A-5B, and FIG. 6 show a series of images to illustrate the multi-capability programming (macro) aspect of the present invention.
Figure 5B:
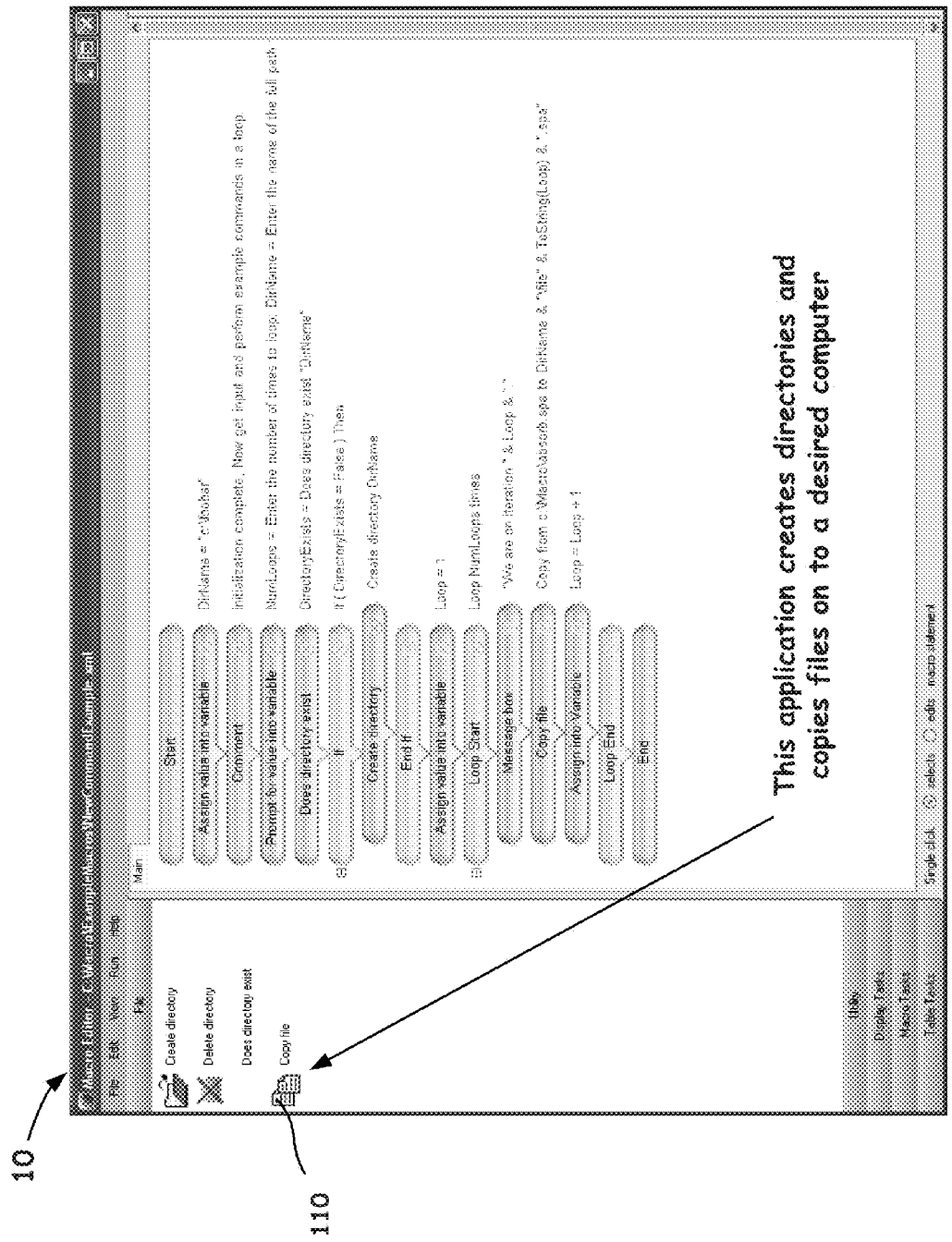
Figure 6:
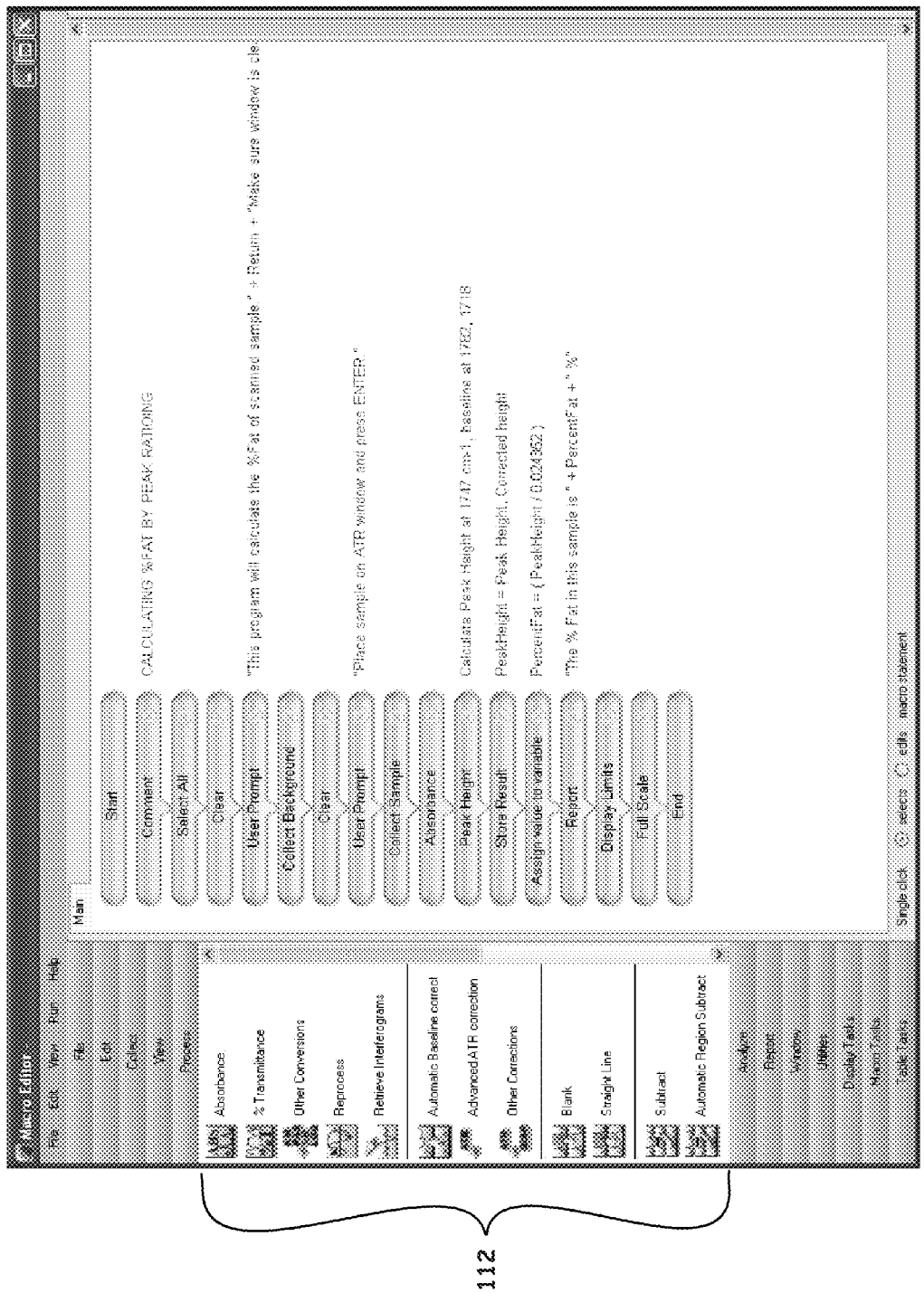

FIG. 5A, 5B, and finally FIG. 6 illustrate the multi-capability macro programming language of the present invention. In particular FIG. 5A, 5B, and FIG. 6 show a series of CUE editor windows to illustrate the ease of automation capabilities for a wide variety of different applications.

FIG. 5A, as somewhat described above with respect to the description of FIG. 1A, shows a Customizable User Interface (CUE) editor window for creating, editing, and testing scripts, as again generally designated by the reference numeral 10. As before, the CUE editor window 10 first appears when the application starts and includes an action pane 12 having actions, e.g., 17 and 18, that can be added to scripts. The actions, e.g., 17 and 18, are most often grouped by function but can be grouped by associated software related to a particular scientific instrument or application. The right pane is deemed the workspace 20 having predetermined action boxes, e.g., Start 16 and an END action 16" initially provided to the end-user for building a desired script. The menu bar 24 provides features for working with scripts, customizing the runtime display, testing scripts and getting help. The point to be made in FIG. 5A is that there are a number of chosen tasks e.g., 17 and 18 that can be added to the workspace in building a macro for a number of applications, as discussed above.

In particular, FIG. 5B shows an application 110 for created directories and copying files onto a computing system in the automation of batch files while FIG. 6 shows the beneficial ability of the present invention to be configured with a large number (e.g., up to about 118) of editable macro tasks (e.g., 112) associated with a desired application, in this example, an FTIR application. The important aspect to take from this is that the macro programming language of the present invention is designed to specify enough interfaces to perform all of its work without making any direct reference to any specific application or any other part of the language. In particular, all of the operations are done through a level of indirection or abstraction, such as creation, manipulation, editing, and execution.

To enable such operations, the present invention provides the capability of all the information associated with one or more applications (as provided with any of above described instruments and/or applications) to be abstracted to an interface in a way that is substantially generic so as to result in support of all the possible diversity in a programming environment. This abstraction is the only information available to each macro programming statement. To enable this capability, the present invention has an application interface (e.g., aptly termed the IApplicationContext interface) which contains all relevant information for extremely complex applications (i.e., comprising greater than a half million statements) in a generic interface that is substantially the same between application software such as, Specta, and UV application software, such as ND2000 and INSIGHT, as provided by, for example, Thermo Fisher Scientific Inc. in association with their commercial instruments.

This application context is the only input to each macro statement and as far as the macro programming language of the present invention is concerned, it simply instructs each statement to execute its functionality using the specified application context. The macro language presented herein does not need to interpret anything about what occurs in each statement. Such an arrangement enables the macro language of the present invention to be used with any of the diverse applications provided by Thermo Fisher Scientific Inc., as shown above.

A programmer skilled in the art, such as a technician or experimenter, can also configure the software of the present invention to support any of the diverse instruments described above in the general description section after creating any DLLs (Dynamic Link Libraries) necessary to perform specific functions of a desired integrated instrument. If a DLL is created that contains one or more command interfaces and the skilled artisan implements an interface to be displayed in the macro editor, such DLL's commands are accordingly exposed to the skilled artisan in the macro editor. For example, a DLL may be created to contain commands to control an associated application, or a DLL may contain the basic commands that are intrinsic to the macro language itself, such as, for example, looping, if statements, and assignment of values into variables. Thus, by adding or subtracting DLL's at runtime, not compile time, changes the functionality and user interface displayed to the skilled artisan while editing and running macros.

Accordingly, such capabilities enable the end user to provide custom steps within a provided program module's processes, to outline their own unique processes, to add displayed informational content, and/or to present information in the format of the end user's particular business application.

It is also to be appreciated that the present invention provides for a command interface which describes all the functionality of an individual statement within the macro language. If an end user creates a command that implements and uses one or more of the interfaces defined, such a command is also compatible with the defined macro language.

Automatic Generation of a Configurable User Interface

As another exemplary embodiment, the present invention provides automatic generation of a configurable user interface that is configured to the intent of a given macro. Such an embodiment enables the automatic generation of necessary UI elements, such as, but not limited to, XY displays of data, tables of information, buttons that perform actions, pictures, etc. In particular, such UI elements can be automatically connected to the developed macro statements specifying the information to be displayed without requiring a level of indirection tying the UI element to the programming code responsible for changing the data to be displayed.

As generally discussed above in describing the customizable user interface with respect to FIG. 1A, the developed one or more macro action statements can be arranged to specify what kind of data to display as well as what specific type so as to trigger a UI to be created and linked to any given statement. The macro language of the present invention is cognizant of this behavior and thus is designed to generate a UI when it first begins execution. This generation is performed either automatically, or as another arrangement, is generated based upon the x, y, width, height, and z order of each element specified by the end-user when he or she last edited the macro. As another beneficial aspect, the macro language of the present invention is designed to monitor for any correlated UI elements and change their contents to reflect the change to the output.

Figure 7A:
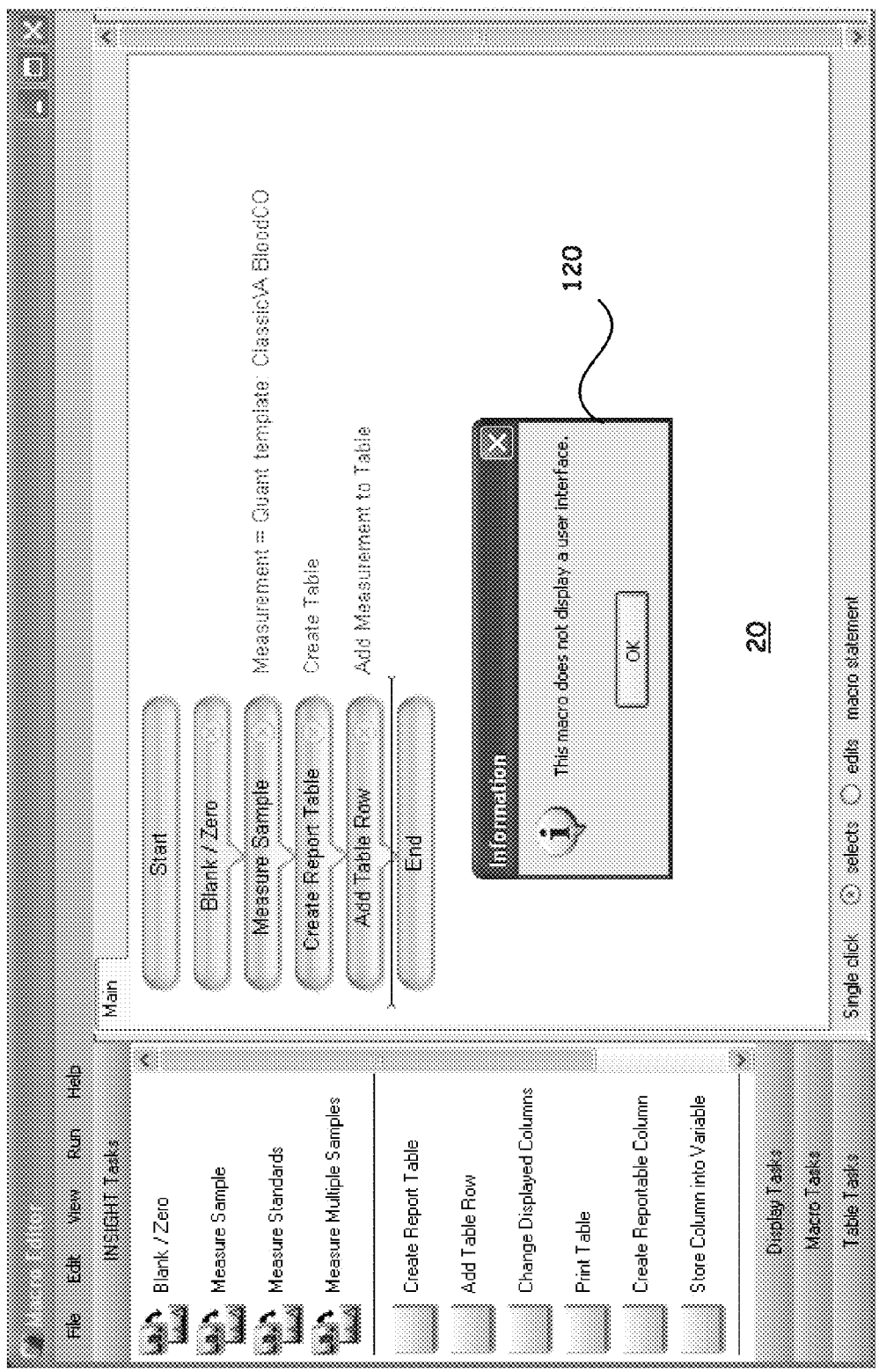
FIGS. 7A, 7B, 8A, and 8B show a series of images to illustrate the auto-user interface (UI) generation capabilities of the present invention.
Figure 7B:
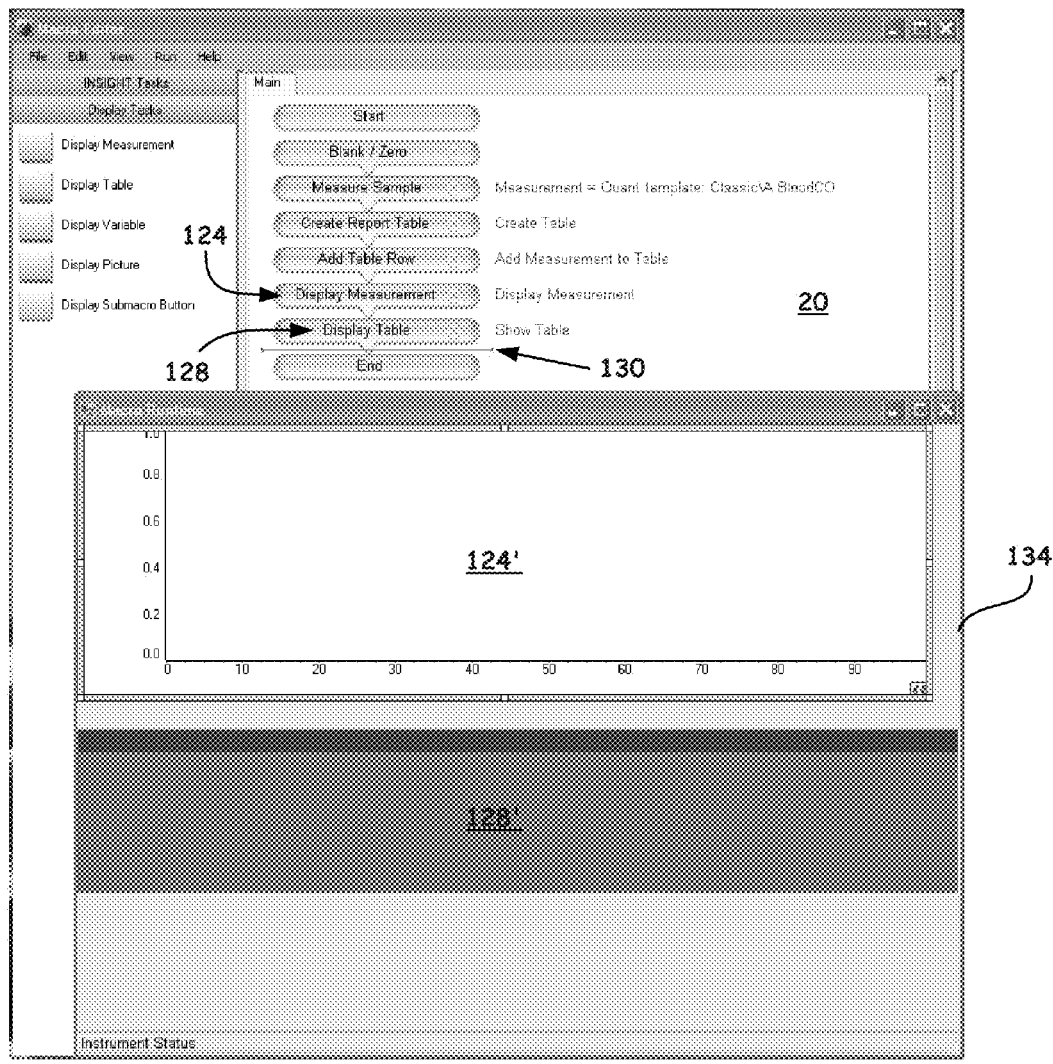

FIGS. 7A, 7B, 8A, and 8B thus illustrate a series of images that shows the macro language automatically generating a user interface based upon the statements dragged onto a screen workspace 20. In particular, FIG. 7A shows that from a pull-down menu, e.g., "View User Interface", the software knows that none of the statements are associated with a interactive user interface, as demonstrated by the pop up information window 120. FIG. 7B shows that by adding the action boxes "Display Measurement"124 and "Display Table" 128 at an insertion point 130 (shown as a horizontal line), an editable user interface (UI) 134 is automatically generated that includes an editable "Display Measurement" portion 124' and an editable "Display table" 128', as enabled by the macro via respective action boxes 124 and 128. As briefly discussed above, the developer can change the size and position of the automatically generated UI elements can be changed (e.g., the x, y, width, height, and z order of each element) and that information will be stored in the macro and used when displaying the UI whenever the macro is executed.

Figure 8A:
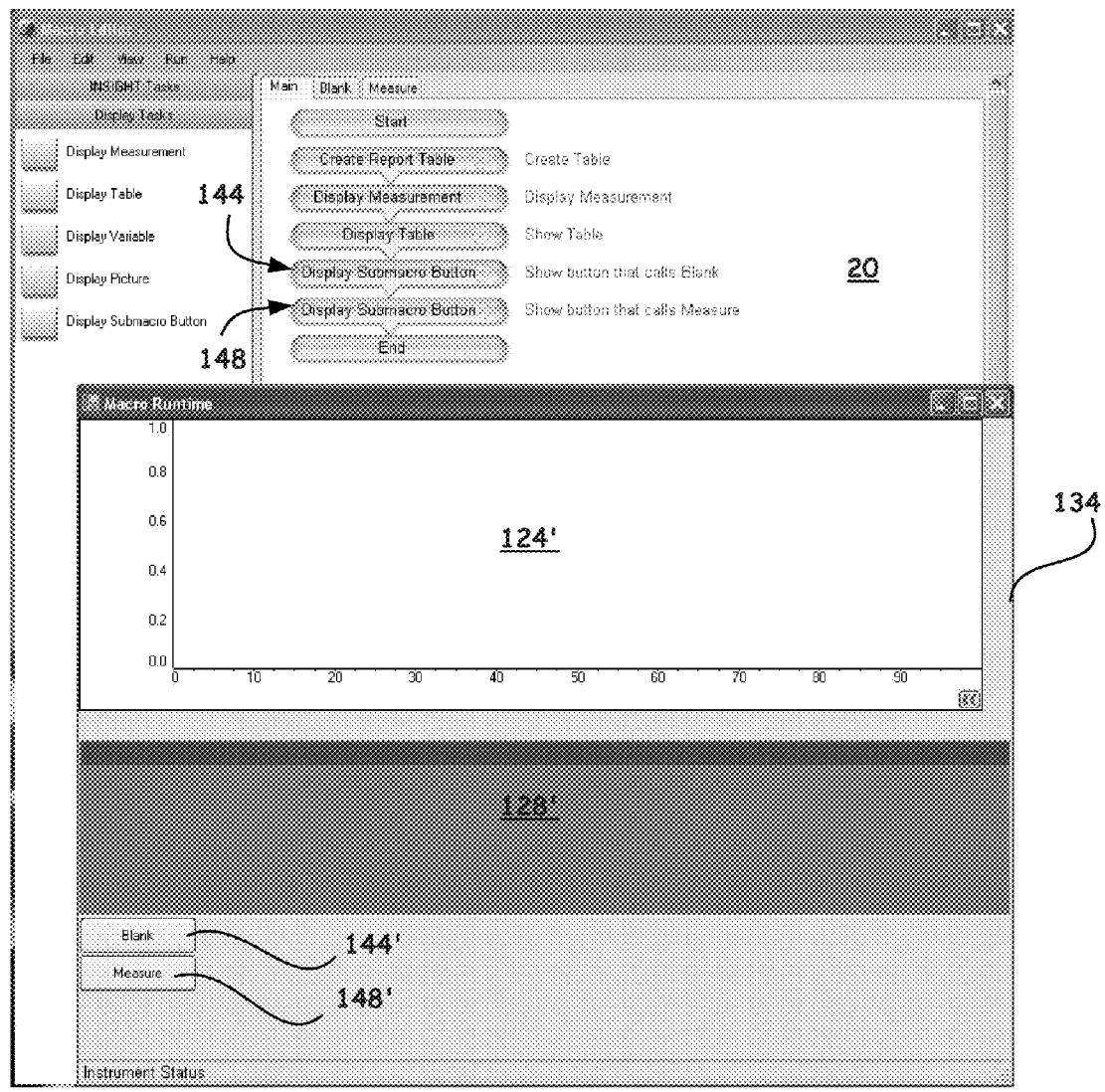
Figure 8B:
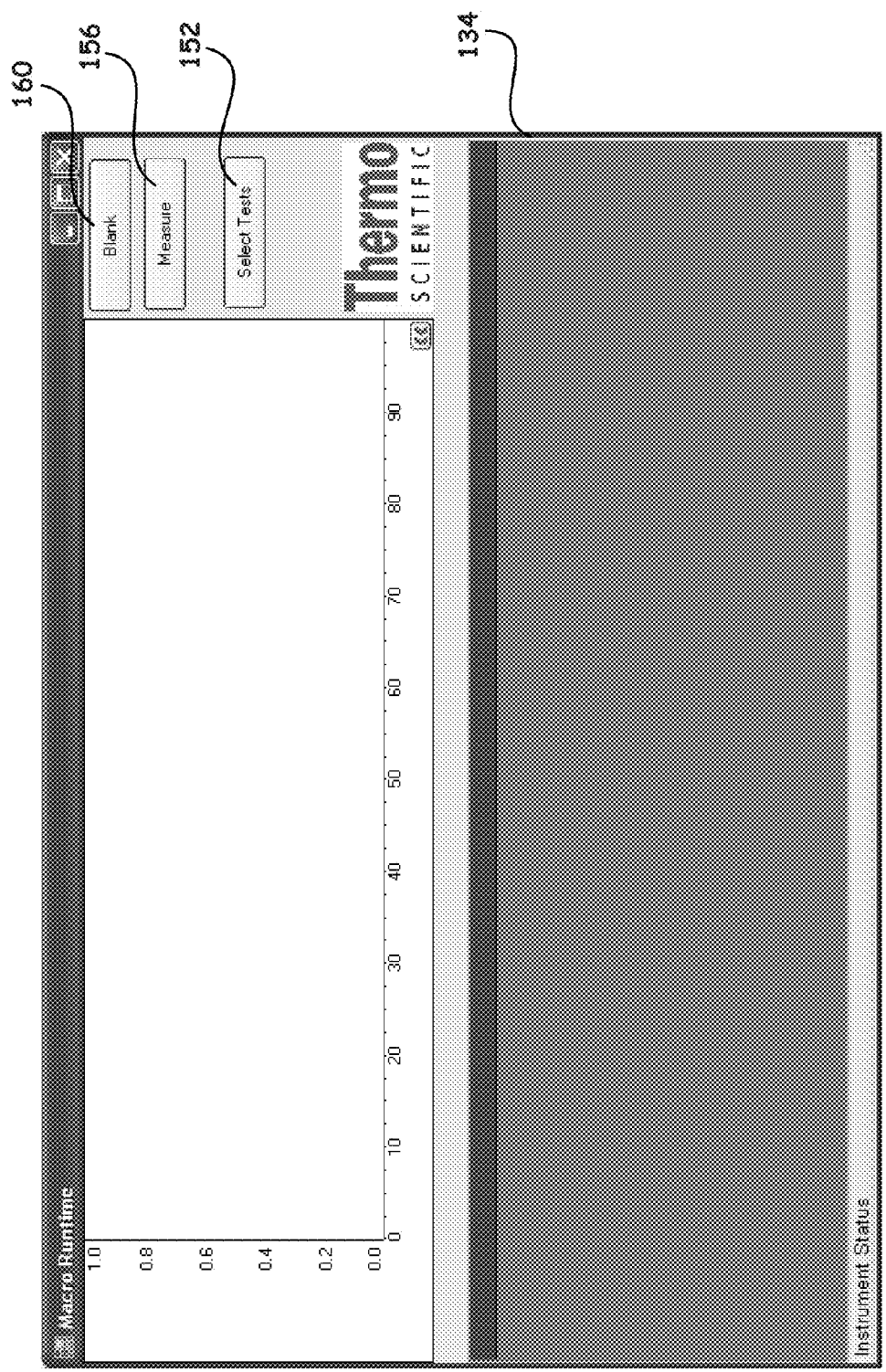

FIG. 8A shows the continuation of the generation of an editable UI application by adding to 2 action boxes, e.g., "Display Submacro Button" 144,148 connected to subtasks in the screen workspace 20 to provide buttons 144', 148' in the editable UI 134. Pressing the buttons 144', 148' executes the subtasks. FIG. 8B is shown merely to illustrate an example of a customized interactive UI for a Wine analysis macro, the customer chooses what tests to perform 152 and when to measure the samples 156 and blanks 160.

Figure 9:
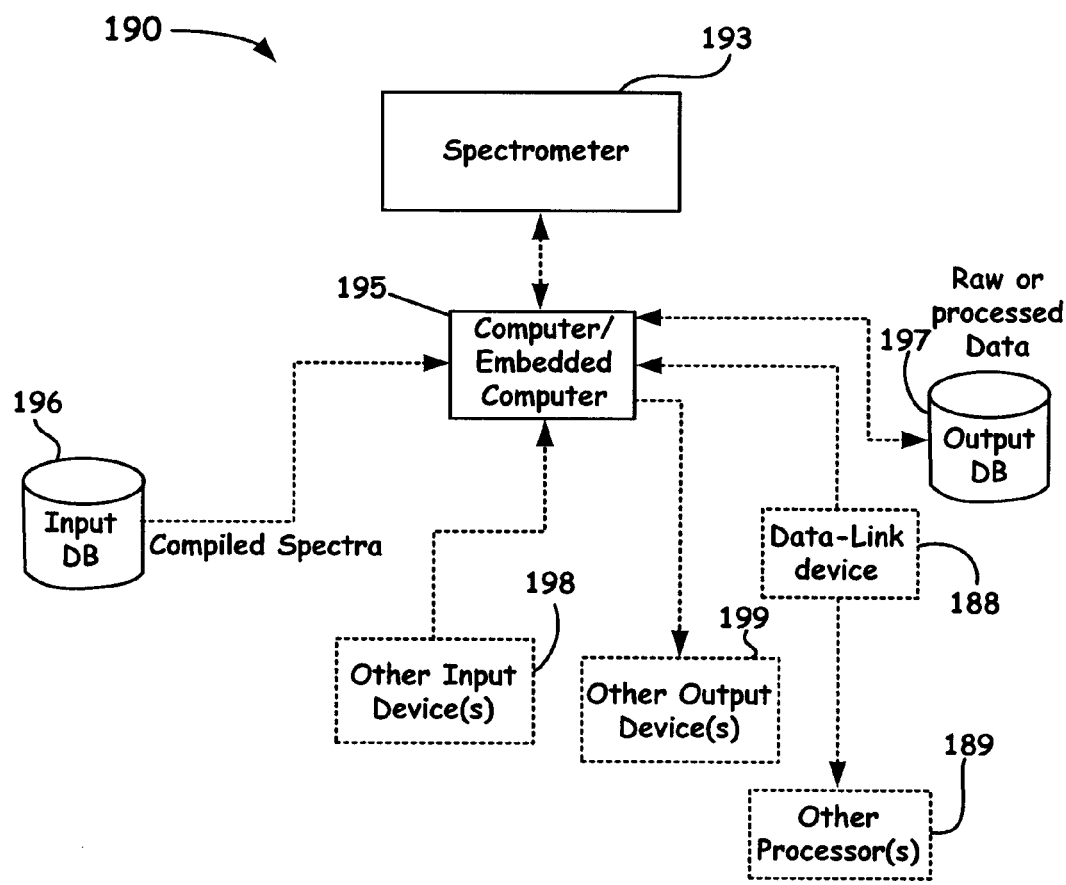
FIG. 9 shows an example system capable of using the macro programming language of the present invention.

FIG. 9 is an illustration of an example system in accordance with the present teachings capable of utilizing the macro programming language of the present invention. The system 190 illustrated in FIG. 9 includes one or more scientific instruments 193, (e.g., a spectrometer) capable of interrogating predetermined samples ranging from pharmaceuticals, chemicals, wine, solids, liquids, etc., for analysis therein. The example system 190 includes a Computer/Embedded computer 195 or other electronic processor or controller that is electronically coupled to 193, so as to provide programmatic control instruction and receive operational data (feedback) via the macro language of the present invention in addition to any other necessary electronic manipulation. System 190 can also include, if desired, a tangibly-embodied computer-readable medium comprising an input database 196 and a tangibly-embodied computer-writeable medium comprising an output database 197. Optionally, the Computer/Embedded Computer 195 may further be electronically coupled to one or more other output devices 199, such as display screens, printers, etc. and/or one or more other input devices 198, such as keyboards, internet connections, etc. It is to be appreciated that the Computer/Embedded Computer 195 can be beneficially configured as an "off the shelf" computer coupled to the spectrometer, as shown in FIG. 9, or embedded as part of the scientific instrument (e.g., spectrometer 193, as shown in FIG. 9) with a touch screen LCD display integrated into the spectrometer instrument. Such an embedded computer can thus display the GUI for desired applications, such as, but not limited to, the Insight software or CUE macros.

Dashed connecting lines in FIG. 9 represent connection pathways that carry electronic signals and the flow of electronic signal information. Arrows on the various connecting lines represent possible direction of flow of information. Mechanical components, themselves, include any necessary power supplies, housings, vacuum lines, etc., even though such ancillary components may not be explicitly shown in the accompanying drawings, for reasons of clarity.

Still with reference to FIG. 9, it is noted that the computer/processor 195 may optionally be electronically connected (e.g., hardwired or wireless)—either through the Internet or as part of an interconnected intranet other private network of computers, such as a local area network—using one or more data-link devices 188 to one more other processors 189 which may share some or all of the calculation load, where required.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A customizable method using a macro language to enable one or more analytical measurements of a sample, comprising:
   dragging one or more desired action statements onto a user interface workspace to provide a desired script;
   automatically connecting and interlinking the inputs and outputs of said one or more action statements, wherein if one or more additional inputs and outputs that are required are not present or cannot be unambiguously provided in said script, the representation of said dragged one or more desired action statements are put into a visual second state, wherein if the one or more additional inputs and outputs can be determined to be connected and interlinked in said script, the representation of said dragged one or more desired action statements are put into a visual first state;
   executing said desired script to provide data according to said action statements; wherein said data include measurements resultant from at least one scientific instrument selected from an optical microscope, a chromatographic instrument, an optical spectrometer, and a mass spectrometer; and
   automatically generating a configurable user interface (UI) element as based upon said one or more action statements of said desired script.

2. The customizable macro software method of claim 1, wherein the step of automatically connecting and interlinking the inputs and outputs of said one or more action statements comprises: implementing an embedded software interface that separates a user interface (UI) editing element for editing said one or more action statements from the code that performs the resultant actions of said one or more action statements.

3. The customizable macro software method of claim 1, wherein the step of executing further comprises executing without compiling.

4. The customizable macro language method of claim 1, further comprising the step of providing a generic interface that is substantially the same between one or more diverse application software configured for said at least one scientific instrument selected from selected from an optical microscope, a chromatographic instrument, an optical spectrometer, and a mass spectrometer.

5. The customizable macro language method of claim 4, wherein said one or more diverse application software further comprises a step of: creating a Dynamic Link Library to perform specific functions of a desired said at least one scientific instrument, wherein an end-user can thereafter manipulate a command interface displayed in a macro editor.

6. The customizable macro language method of claim 1, wherein a command interface is provided to describe all the functionality of an individual statement associated with said one or more desired action statements of said desired script.

7. The customizable macro language method of claim 1, wherein the step of automatically generating a configurable user interface (UI) element further comprises automatically adding at least one of: button controls, XY displays of data, tables of information and pictures.

8. The customizable macro language method of claim 1, wherein said data includes at least one of: imaging data, chromatography data, mass spectral, UV-Vis, Fourier Transform, Fourier Transform Infrared (FTIR), Fluorescence, Phosphorescence, Raman, Infrared (IR), and X-Ray data.

9. The customizable macro language method of claim 8, wherein said data is a composite of different types of data.

10. A non-transitory computer readable medium having computer-executable instructions, comprising:

directing one or more desired action statements onto a user interface workspace to provide a desired script;

automatically connecting and interlinking the inputs and outputs of said one or more action statements, wherein if one or more additional required inputs and outputs are not present or cannot be unambiguously provided in said script, the representation of said dragged one or more desired action statements are put into a visual second state, wherein if the one or more additional inputs and outputs can be determined to be connected and interlinked in said script, the representation of said dragged one or more desired action statements are put into a visual first state;

executing said desired script to provide spectral data according to said action statements; wherein said spectral data include measurements resultant from at least one scientific instrument selected from an optical microscope, a chromatographic instrument, an optical spectrometer, and a mass spectrometer; and automatically generating a configurable user interface (UI) element as based upon said one or more action statements of said desired script.

* * * * *